United States Patent
Nannini

Patent Number: 5,638,146
Date of Patent: Jun. 10, 1997

[54] COLLAPSIBLE SPECTACLES

[75] Inventor: Giorgio Nannini, Modena, Italy

[73] Assignee: Giorgio Nannini S.r.l., Modena, Italy

[21] Appl. No.: 629,391

[22] Filed: Apr. 8, 1996

Related U.S. Application Data

[63] Continuation of PCT/IT94/00155, Sep. 27, 1994 published as WO95/10064, Apr. 13, 1995

[30] Foreign Application Priority Data

Oct. 7, 1993 [IT] Italy ............................ MO930026 U

[51] Int. Cl.⁶ ............................ G02C 5/08; G02C 5/14; G02C 5/22; A41D 27/20

[52] U.S. Cl. ............................ 351/63; 351/119; 351/153; 2/454; 16/228

[58] Field of Search ............................ 351/63, 119, 118, 351/111, 115, 153, 41; 2/454, 426; 16/228

[56] References Cited

U.S. PATENT DOCUMENTS 4,740,069  4/1988  Baum ............................ 351/59

FOREIGN PATENT DOCUMENTS

| 0056822 | 4/1982 | European Pat. Off. . |
| 0512173 | 11/1992 | European Pat. Off. . |
| 0515826 | 12/1992 | European Pat. Off. . |
| 63-307425 | 12/1988 | Japan ............................ 351/111 |
| 89/06822 | 7/1989 | WIPO . |

Primary Examiner—Hung Dang
Attorney, Agent, or Firm—Browdy and Neimark

[57] ABSTRACT

The invention relates to collapsible spectacles provided with two arms (4) connected to a flat lens frame (2) and which can be folded into a collapsed configuration in which they are coplanar and situated side-by-side with the lens frame (2), one at an upper long side and another at a lower long side of said lens frame (2). Each arm (4) comprises a first segment (5), constrained at a first hinge (6) to a halfway point of a smaller side of the lens frame (2), and being of about half a length of said smaller side, and a second segment (7) hinged to the first segment (5) and having a perpendicular axis to the axis of the first hinge (6).

4 Claims, 2 Drawing Sheets

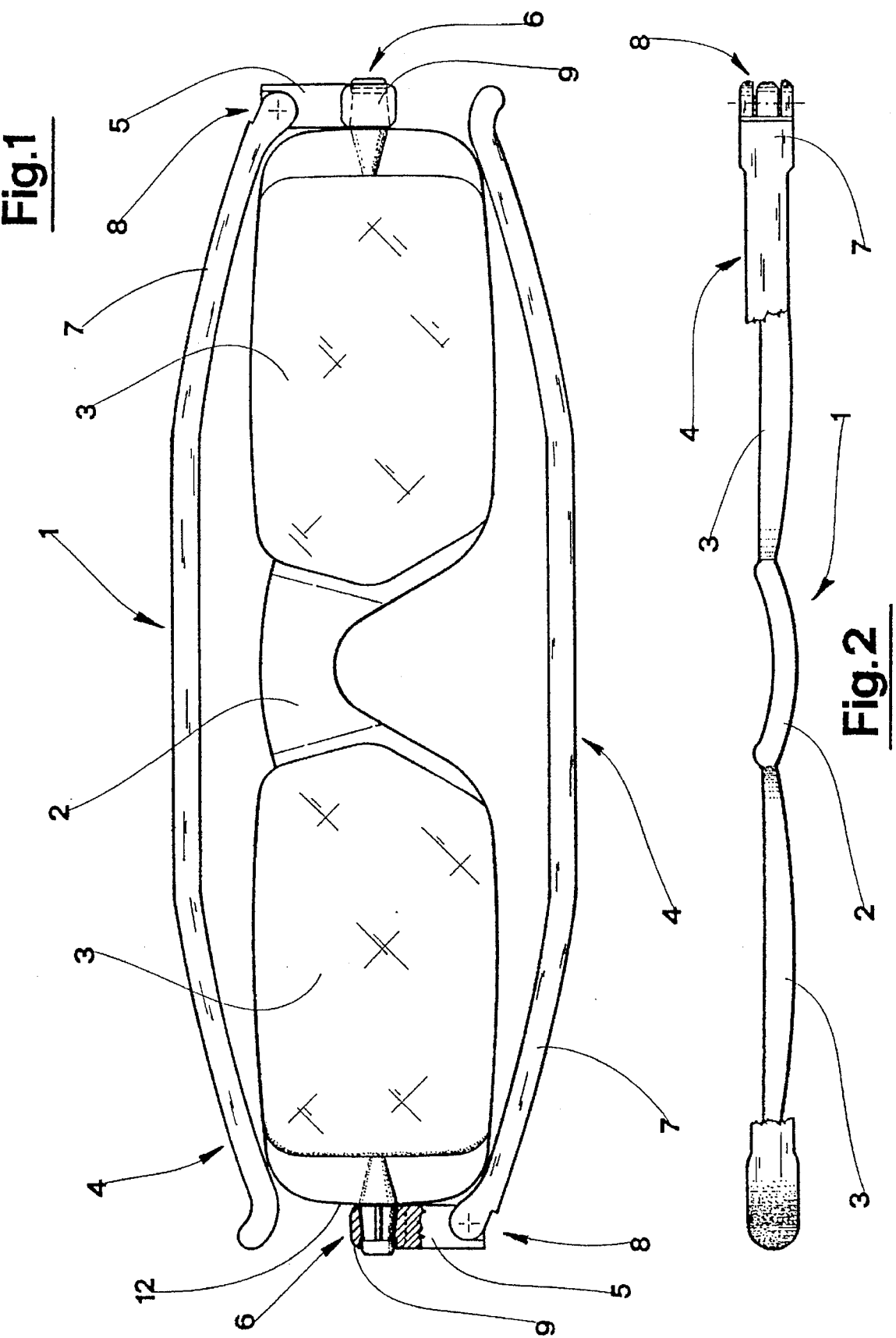

2

COLLAPSIBLE SPECTACLES

This application is a continuation of PCT/IT94/00155, filed Sep. 27, 1994, now abandoned, the filing date of which is claimed under 35 USC 120.

TECHNICAL FIELD

The invention relates in particular to collapsible spectacles having a substantially flat lens frame and two arms which can be rotated about two axes, one perpendicular to another, and which can be folded up until a configuration of the whole is achieved wherein the arms are parallel to and contacting the lens frame and almost substantially coplanar to the latter.

Some examples of this type of spectacle exist in the prior art: Japanese patent JP 4818828 and U.S. Pat. No. 4820035 being the principal examples. The latter of the above-mentioned documents teaches a pair of spectacles in which each arm, consisting of two distinct segments, is independently constrained to the lens frame, and wherein the first of the segments is hinged by an end to one of the temple sections of the lens frame by a first hinge, whereas the second segment is hinged to the first segment by a second hinge having a perpendicular axis to the first hinge axis. Known-type spectacles of the above kind are collapsible into a size and shape that perfectly suits a pocket or a slim case, as the arms can be folded along a same, generally lower side, of the lens frame. They do, however, present some limits and drawbacks.

Firstly, the length of the arms is limited, since an arm which is placed side-by-side to the lower side of the lens frame cannot be longer than the lens frame itself without sacrificing the flat shape of the collapsed whole.

Secondly, the collapsible spectacles are not truly suitable for plastic die-casting processes as they comprise a large number of different parts, each of which has to be cast independently, leading to a considerable complexity of manufacture and assembly.

DISCLOSURE OF THE INVENTION

The invention, as it is characterized in the claims that follow, obviates the above-mentioned drawbacks by providing collapsible spectacles which are constructionally simple and economical, having arms which can be brought into lateral positions, one above and one below the lens frame, resulting in a flat and compact final collapsed configuration.

A further aim of the invention is to provide collapsible spectacles wherein the lens frame and the lenses can be realized practically and economically in a single piece, for example by plastic die-casting.

In particular, the invention permits of realizing collapsible spectacles with only a limited number (maximum three) of different Constituent parts.

An advantage of the invention is that the arms are free to rotate, according to respective planes arranged laterally and perpendicular to the lens frame, thus performing complete 360 degree rotations and allowing the spectacles to be adapted to an individual user head shape.

A further advantage is that the lenses can be positioned upwards or downwards by the user in relation to the optical axis, so that the lenses are kept in position in front of the eyes, and rest properly on the nose.

Further characteristics and advantages of the present invention will better emerge from the detailed description that follows, of an embodiment of the invention, illustrated in the form of a non-limiting example in the accompanying drawings, in which:

FIG. 1 is a schematic frontal view of the invention in its collapsed position;

FIG. 2 is a schematic view from above of FIG. 1, with some parts removed better to evidence others;

Figure 3:
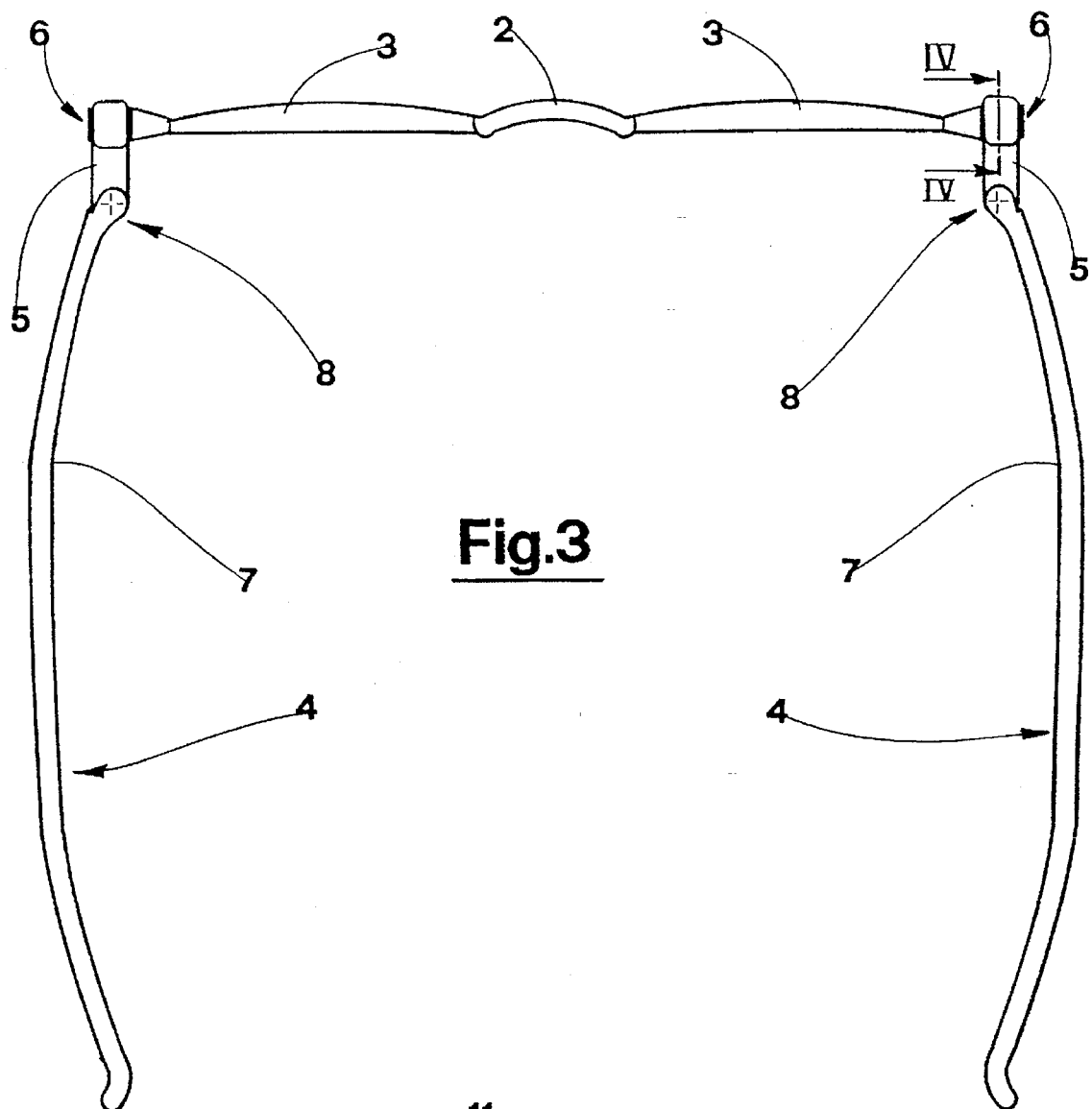
FIG. 3 is a schematic view from above of the invention in a position of use.
Figure 4:
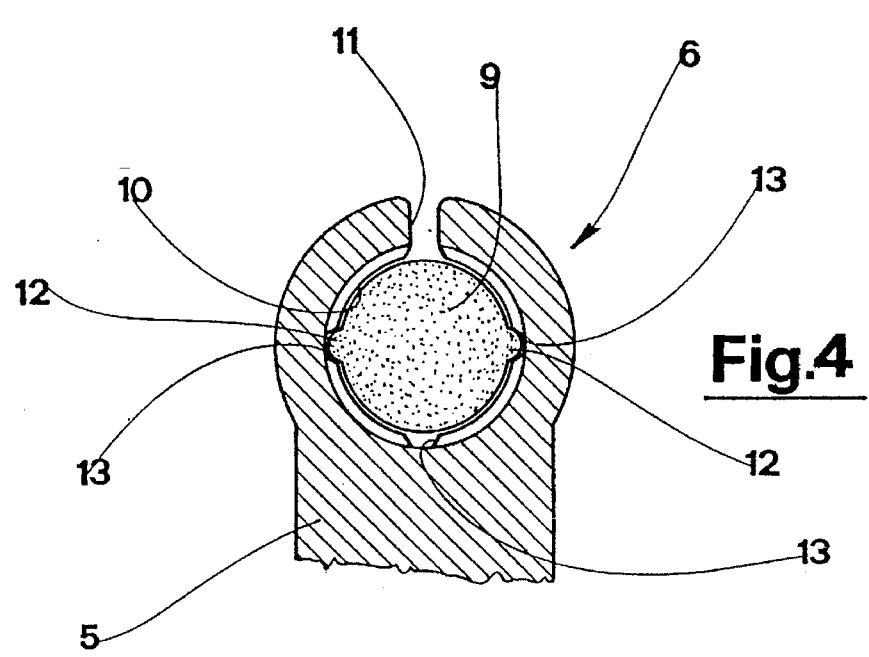
FIG. 4 is a schematic section in enlarged scale according to line IV—IV of FIG. 3.

With reference to the drawings, 1 denotes a pair of collapsible spectacles, provided with a substantially flat lens frame 2 and two lateral arms 4, all realized in plastic. The lens frame 2 bears a pair of plastic lenses 3 cast in a single piece with the lens frame 2. Obviously the lens frame 2 and the lenses 3 could be made separately.

Each arm 4 comprises a short first segment 5 and a long second segment 7: the first segment 5 is hinged by an end to a side of the lens frame 2 by a first hinge 6. The hinge 6 comprises a projecting cylindrical or conical articulation provided with a pivot 9 made in a single piece with the lens frame 2 and rotatably coupled to a bush 10 predisposed at an end of the first segment 5 and rotatable about the pivot 9 by 360 degrees.

The bush 10 exhibits a gully 11 to facilitate insertion of the first segment 5 on to the pivot 9, which is slightly conical to aid said insertion. Three recesses 13 are afforded in an internal wall of the bush 10, one of which recesses 13 is positioned diametrically opposite the gully 11 and two of which are placed at 90 degrees to the gully 11, one to the left and one to the right. The pivot 9 exhibits two diametrically opposite projections 12, so made as to couple either with the two opposite recesses 13, or the gully 11 and the remaining recess 13 opposite the gully 11.

The second segment 7 is hinged to the first segment 5 at a second hinge 8 having an perpendicular axis to the axis of the first hinge 6. The second hinge 8 comprises a forked cylindrical articulation where the prongs of the fork are made on the second segment 7 and the pivot is constituted by two projections made laterally on the prongs and coupling rotatably with two corresponding holes afforded by the first segment 5.

The axes of the two first hinges 6 are aligned and positioned in the middle of the two shorter sides of the lens frame 2. The first segments 5 are of about half the length of the short side of the lens frame 2, and are considerably shorter than the total length of the arms 4.

Each second segment 7 is constrained to the lens frame 2, can rotate about two axes, one perpendicular to the other, and can be brought into a collapsed configuration wherein it lies on the plane of the lens frame 2 and is side-by-side with and either above or below the same. The first segments 5 lie flat against the short sides of the lens frame 2. FIG. 1 shows the spectacles in the collapsed configuration, and demonstrates that no interference exists between the arms 4, as one is against the upper side of the lens frame 2 while the other is below; both being coplanar with the lens frame 2. Thus there are no limits to the length of the arms 4 dictated by the necessity of having a flat collapsed configuration. Obviously, if so desired, the arms 4 can be both folded to a same side of the lens frame 2.

Each arm 4 can rotate about a first hinge 6, moving according to a plane which is perpendicular to the lens frame 2 and disposed laterally to said frame 2, and can rotate up to 360 degrees. Thus the spectacles can be adapted to a user's face shape, and furthermore the lenses can be oriented with respect to the optical axis either upwards or downwards, while the user is actually wearing them. During the course of rotating the arms 4 about the first hinge 6, at each 90 degree turn the projections 12 lodge in two of the opposite recesses 13, or the gully 11 and its opposite recess 13. Hence the arms 4 can be placed in four very stable positions, corresponding to those in which the projections 12 are inserted in a recess 13 or in the gully 11.

In particular, in the configurations of FIG. 1 (collapsed) and FIG. 3 (use position), the arms 4 are in two of the above-mentioned positions of great stability. The spectacles 1 are constituted by three types of components: a lens frame 2, two first segments 5 and two second segments 7, each of which is die-cast and press-assembled.

The material used to make the spectacles can be either plastic or metal: in the second case the lens frame 2 and the lenses themselves will obviously not be cast in one piece. The arms 4 are identical one to another, while usually in spectacles they are symmetrical, so that they can be substituted without modifying the overall structure of the spectacles.

This last fact facilitates both the construction of the arms 4, which are cast using only two dies (one for the first segments and one for the second segments), and for the spectacle assembly.

Obviously numerous modifications of a practical-applicational nature can be brought to the invention without its foresaking the sought field of protection of the inventive idea as claimed hereinbelow.

I claim:

1. Collapsible spectacles, comprising: a substantially flat lens frame (2) bearing a pair of lenses (3); two arms (4), each of which is constrained to the lens frame (2) and is rotatable about two axes, one axis of which axes being perpendicular to another one of said axes; each of said arms (4) being positionable in a collapsed configuration wherein the lens frame (2) and each of said arms (4) substantially lie on a same plane, each of said arms (4) being positioned close to a longer side of the lens frame (2); each of said arms (4) comprising: a first segment (5), hinged by an end to one of two shorter sides of the lens frame (2) at a first hinge (6); a second segment (7), hinged to the first segment (5) at a second hinge (8) having an axis which is perpendicular to an axis of the first hinge (6); characterised in that: the axes of the two first hinges (6) are aligned and positioned in the middle of the two shorter sides of the lens frame (2); said first segments (5) are of about half a length of the shorter side of the lens frame (2), thereby enabling a collapsed configuration of the spectacles to be achieved, in which one of the arms is positioned above the lens Frame, and the other arm is positioned below the lens Frame.

2. Collapsible spectacles as in claim 1, characterised in that the first hinges (6) comprise pivots (9) made in a single piece together with the lens frame (2).

3. Collapsible spectacles as in claim 2, characterised in that each pivot (9) of the first hinges (6) is slightly conical and is rotatably coupled with a bush (10) predisposed on an end of the first segment (5); a gully (11) being provided on the bush (10) and, on an internal wall of the bush (10) there being three recesses (13), one being in a diametrically opposite position to the gully (11) while the diametrically opposite position to the gully (11) while the remaining two are opposite one to the other and are situated each at 90 degrees in relation to the gully (11); two diametrically opposite projections (12) being predisposed on the pivot (9) for coupling with the recesses (13) or the gully (ii).

4. Collapsible spectacles as in claim 1, characterised in that the first segments (5) are identical, as are the second segments (7).

* * * * *